United States Patent Office 3,531,325
Patented Sept. 29, 1970

3,531,325
PROCESS OF PREPARING SILVER OXIDE ELECTRODE
Walter Karl Lux, Kelkheim, and Tsvetko Chobanov, Frankfurt am Main, Germany, assignors to Varta Aktiengesellschaft, Frankfurt am Main, Germany,
No Drawing. Filed June 2, 1969, Ser. No. 829,735
Claims priority, application Germany, June 4, 1968, 1,771,522
Int. Cl. H01m *35/02, 13/00*
U.S. Cl. 136—20      2 Claims

ABSTRACT OF THE DISCLOSURE

Process of preparing a silver oxide electrode suitable for use in alkaline primary and secondary cells comprising a metal carrier constituting a part of an electrode wherein a paste prepared from AgO and a cold flowing polymerizate is pulverized and applied to at least one side of the carrier.

---

This invention relates to novel silver oxide electrodes suitable for use in alkaline primary and secondary cells and to a process for the preparation of such electrodes.

Generally, electrodes containing silver oxide as the electrochemically active component are prepared by shaping loose disperse structures from elementary silver converted into silver oxide. In this method, either silver powder is directly sintered as the starting material which is silver oxide is first applied to a carrier in the form of a paste, following which sintering and pressing are carried out. Electrodes of this type prepared from silver oxide can be constructed or formed by better and more efficient methods. Such electrodes generally consist of a silver framework which contains a grid, mostly of silver ductile metal as a reinforcement and a current conductor. Such electrodes are thereafter anodically oxidized in alkaline solution, and often an oxidation degree corresponding to from $AgO_{0.7}$ to $AgO_{0.9}$ is obtained. Due to this oxidation degree, the capacity in ampere hours of these electrodes is lower in comparison to the electrodes prepared from pure AgO. Furthermore, the formed electrodes often contain alkali residues which decrease the storageability thereof and moreover their preparation is expensive and complicated.

It is also known to prepare silver oxide plates having good electrochemical properties but poor mechanical strength characteristics directly from silver oxide, preferably silver (II) oxide, either by dry pressing under high pressures or from a paste of water and silver oxide.

The problem up until the invention has been to provide a silver oxide electrode which has, without being sintered and thereafter shaped and formed, a mechanical strength corresponding to that of the sintered electrodes and also an improved resiliency and flexibility as far as this is possible. Moreover in increased capacity, based on the weight of the electrode is also desirable.

The silver oxide electrode in accordance with the invention meets all of these high requirements. It comprises a metal carrier, onto at least one side of which there has been applied silver (II) oxide containing 0.2 to 10% by weight, and preferably from 0.5 to 3% by weight of a cold flowing polymerizate in finely divided form. The polymerizate is one which is resistant to silver (II) oxide.

The electrodes of the invention are distinguished from the pasty and coarse surfaces of the formed or shaped electrodes of the art by their smoother and nearly metallically glossy surfaces. The different surfaces involved have substantially no influence on the resultant electrical properties, however the prepared electrodes of the invention can be easily distinguished from those of the art not only by their outward appearance but also by their mechanical properties; the electrodes of the invention being substantially more flexible and tougher than the sintered and shaped electrodes.

Polyisobutylene has been found to be particularly suitable for use as a binding agent, i.e., as the polymerizate for the dry pressed silver oxide electrodes. As a substantially saturated hydrocarbon, it is resistant also under the conditions which are connected with the use of the electrodes. In contrast to polyisobutylene, unsaturated hydrocarbons can be oxidized by silver (II) oxide and halogen containing polymers such as chloroprene can react with silver compounds. High molecular weight polyisobutylenes having an average molecular weight of from about 1,000,000 to about 6,000,000, which are readily soluble in gasoline constitute excellent binding agents. However any suitable cold flowing polymerizate resistant, i.e., inert to silver (II) oxide, can be used as binding agent.

The polymerizate is dissolved in a non-polar organic solvent such as an aliphatic, cycloaliphatic or aromatic hydrocarbon. Preferred instances of such hydrocarbons are gasoline and cyclohexane.

The AgO powder which generally is obtained by chemical means is added to the (pseudo) solutions of the high molecular weight polymerizate. Thereafter the solvent is removed under continuous or discontinuous stirring. In this manner AgO particles are obtained which possess a thin and partially porous coating composed of the polymerizate.

The solutions used in accordance with the invention generally have a content of binding agent of between 0.2 and 5% by weight, and preferably of between 0.5 and 2% by weight. Higher percentages of binding agent than those just indicated have the result that too viscous solutions are formed, while lower percentages are uneconomical because of the necessity for removal of excess solvent.

In order to improve the current conduction and particularly in order to prevent as far as possible the so-called "working" of the electrode which occurs after repeated charging of the cell preferably silver powder and/or chips are incorporated into the AgO powder.

The silver (II) oxide which contains from about 0.2 to 10% by weight of a cold flowing polymerizate is applied to a metal carrier which in turn is part of an electrode. The metal carrier which represents, for instance, an ovelayer of the electrode can constitute a metallic network or fabric, or a perforated foil or a sintered foil. As suitable metals, silver, copper or silver plated copper are preferably used. Particularly preferred for this purpose is a single or double layer of ductile metal to which the electode mass is then securely fastened.

In some cases, for instance, if relatively thick layers or plates are to be applied, it is preferred to arrange the silver (II) oxide mass between two current conducting supporting layers.

The present invention is also directed to a process for the preparation of the silver oxide electrodes of the inveniton. This process comprises preparing a paste from stoichiometrically composed AgO, a cold flowing polymerizate, preferably polyisobutylene, which is resistant to AgO and a non-polar solvent, evaporating the solvent off from the paste under agitation or stirring thereof, pulverizing the residue thusly obtained and applying it to a metal carrier which constitutes part of an electrode, preferably under pressure of from about 0.3 to about 1.4 t./cm.$^2$. In the application of the residue to the carrier, a supporting framework may be used.

According to an embodiment of the process of the invention, a stoichiometrically composed AgO obtained by reaction of $K_2S_2O_8$ with $AgNO_3$ is added to a solution of a cold flowing polymerizate in a non-polar solvent, the solvent then removed under stirring in order to prevent a separation into phases and preferably in vacuo, the residue thereby obtained pulverized and this material pressed without additional heating, with or without a supporting framework into an electrode form under a pressure of from about 0.3 to about 1.4 t./cm.$^2$.

The electrodes of the invention can be used in Ag-Zn activatable primary and secondary cells and in Ag-Cd secondary cells, in high quality electrical equipment and are particularly useful for emergency and rescue equipment and for military and spacecraft applications.

The process of the invention is very flexible and is particularly suitable for the economic construction of cells having special i.e., custom properties and when only relatively few of each type or specification are required.

The following example illustrates but does not limit the scope of the invention.

EXAMPLE 1.5 g. of a high molecular weight polyisobutylene having an average molecular weight of about 5,000,000 was dissolved in 100 ml. test gasoline having a boiling range of between about 130 to 220° C. were added to 100 g. silver (II) oxide under stirring until a uniform paste was formed.

The solvent was then removed at 60° C. in vacuo. In order to prevent separation into phases stirring was necesary. The residue was passed through a sieve DIN 16 400W MW 240 DRST and there was obtained a finely divided loose powder. It was stable to storage in this condition.

In order to prepare plates having a size of 64 x 47 x 0.6 mm., 3.5 g. of the silver oxide powder obtained as just set out were brushed into a pressing mold, a ductile metal sheet which was provided with a conductor tab was placed upon the powder layer and an additional 3.5 g. of silver oxide mass was applied by brushing. The pressing was carried out under a pressure of 1 t./cm.$^2$. The plates obtained had a capacity of 3 a.-hr. as measured against zinc electrodes. The silver oxide mass had a porosity of about 50% by volume.

Further testing established that electrodes can be prepared by passing the silver oxide mixture of the invention together with a ductile metal sheet through rolls or by preparing foils from the silver oxide mass which are then pressed onto both sides of the ductile metal sheet.

While the invention has been illustrated and described as embodied in silver oxide electrode for alkaline primary cells and process of preparing the same, it is not intended to be limited to the details shown, since various modifications and structural changes may be made without departing in any way from the spirit of the present invention.

What is claimed as new and desired to be protected by Letters Patent is set forth in the appended claims:

1. Process for preparing a silver oxide electrode which comprises forming a paste from stoichiometrically composed AgO, a cold flowing polymerizate which is resistant to AgO and a non-polar solvent, separating off said solvent from said paste under stirring, pulverizing the residue thus obtained and applying said residue to a metal carrier which constitutes a part of an electrode.

2. A process according to claim 1 wherein said pulverized residue is applied to said metal carrier at a pressure of from about 0.3 to about 1.4 t./cm.$^2$.

References Cited

UNITED STATES PATENTS

| | | | |
|---|---|---|---|
| 3,007,991 | 11/1961 | Duddy | 136—20 |
| 3,120,457 | 2/1964 | Duddy | 136—120 |
| 3,282,732 | 11/1966 | Bradley et al. | 136—20 |
| 3,332,801 | 7/1967 | Holechek et al. | 136—21 |

WINSTON A. DOUGLAS, Primary Examiner

A. SKAPARS, Assistant Examiner

U.S. Cl. X.R.

75—21; 136—75, 120